May 2, 1950     H. E. CARNAGUA ET AL     2,505,881
TRANSMISSION CONTROL
Filed June 26, 1943     3 Sheets-Sheet 1
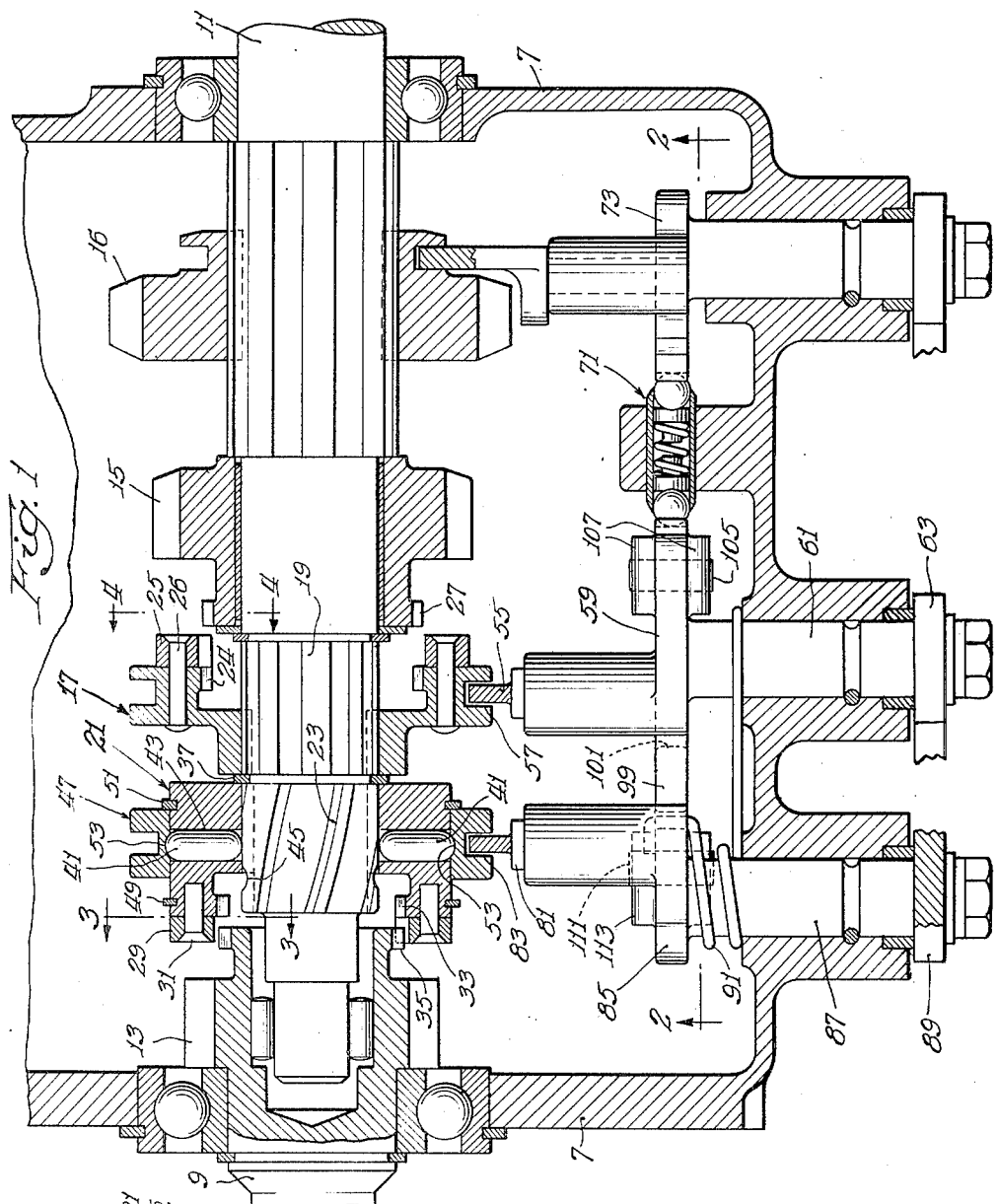
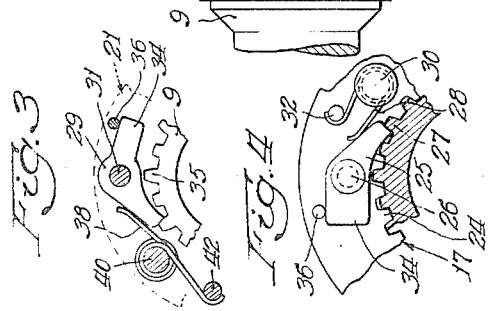
Inventors:
Harold E. Carnagua
Maurice N. Bareham
By: Edward C. Gitzbaugh
Atty.

May 2, 1950     H. E. CARNAGUA ET AL     2,505,881
TRANSMISSION CONTROL
Filed June 26, 1943     3 Sheets-Sheet 2
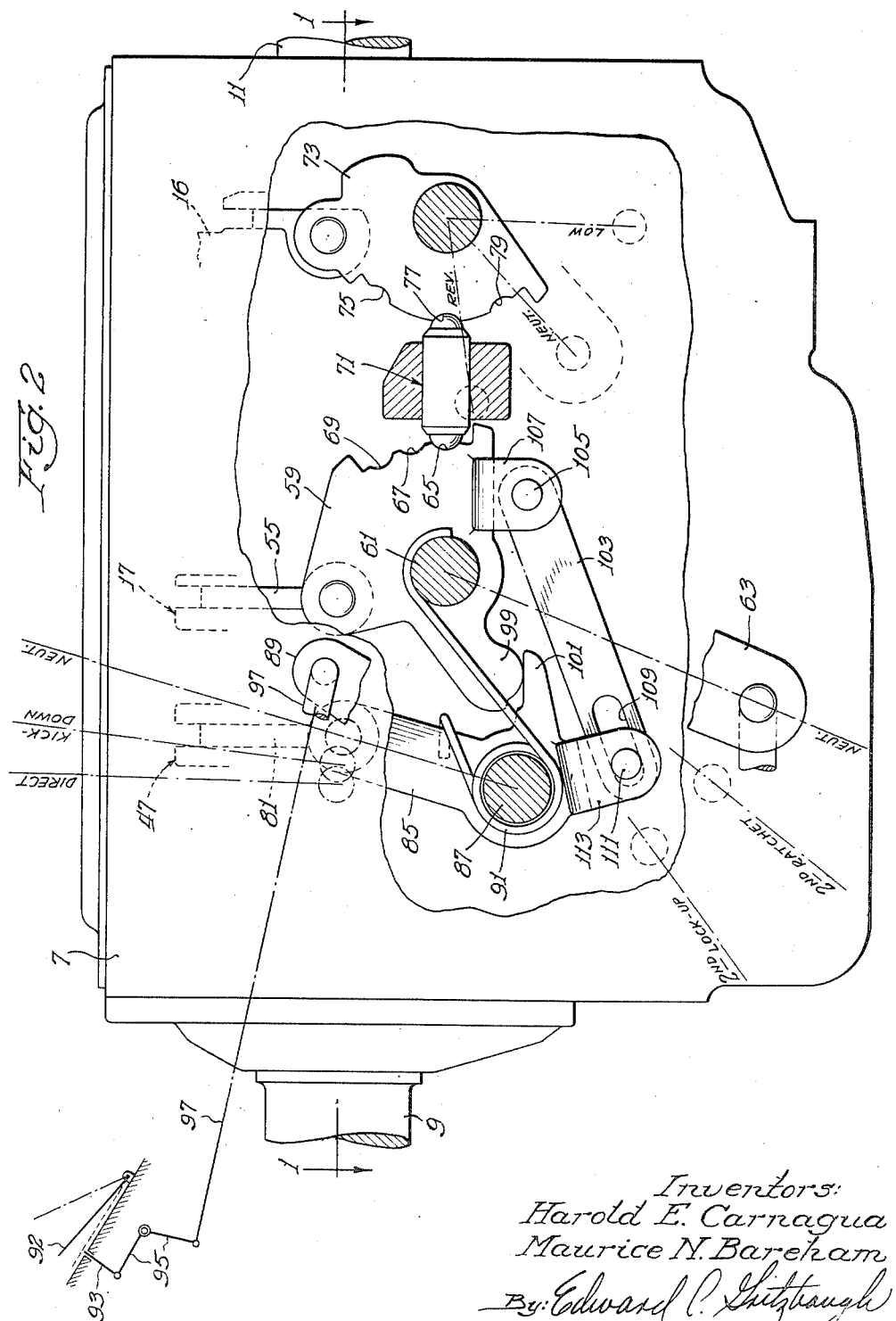
Inventors:
Harold E. Carnagua
Maurice N. Bareham
By Edward C. Gitzbaugh
Atty.

May 2, 1950 H. E. CARNAGUA ET AL 2,505,881
TRANSMISSION CONTROL
Filed June 26, 1943 3 Sheets-Sheet 3
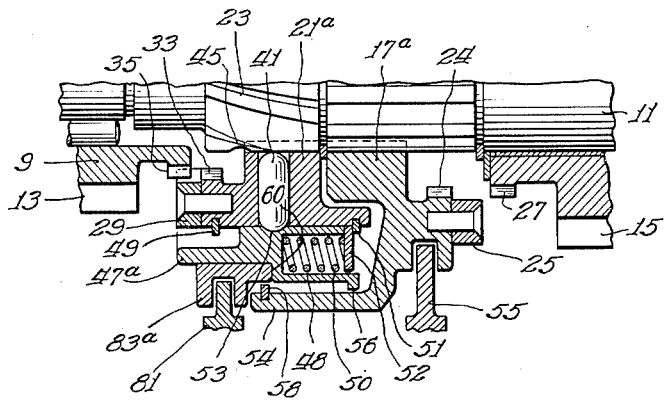
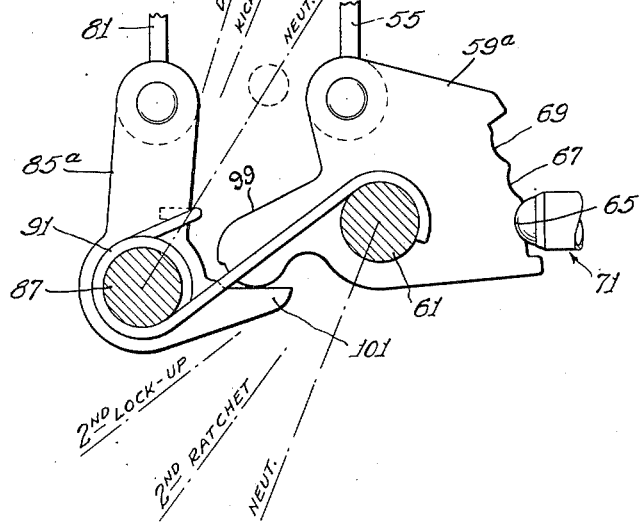
Inventors:
Harold E. Carnagua
Maurice N. Bareham
By: Edward C. Fitzbaugh
Atty.

Patented May 2, 1950

2,505,881

UNITED STATES PATENT OFFICE 2,505,881

TRANSMISSION CONTROL

Harold E. Carnagua and Maurice N. Bareham, Muncie, Ind., assignors to Borg-Warner Corporation, Chicago, Ill., a corporation of Illinois Application June 26, 1943, Serial No. 492,376

25 Claims. (Cl. 74—337)

This invention relates to transmissions and has as its general object to provide a transmission in which the shift from a lower to a higher ratio occurs automatically in response to one driving condition and in which the shift from the higher ratio back to the lower ratio occurs automatically in response to an opposite driving condition. The terms lower and higher ratio, here as in other places in the specification where these or equivalent terms appear, mean speed ratios between input and output members in which the output member is rotated at a certain speed and at a certain higher speed respectively with respect to the input member.

More specifically, the invention contemplates the provision for torque responsive upshifting from a lower speed ratio to a higher ratio in response to engine deceleration; locking out against torque-responsive operation in the higher ratio; and torque-responsive downshifting, effected under operator-controlled release of the lockout in conjunction with engine acceleration, from the higher ratio back to the lower ratio; in an otherwise conventional manually shifted motor vehicle transmission.

The invention makes use of an improved synchronizing positive clutch mechanism of the type disclosed in applications for United States Letters Patent, identified as Serial Nos. 492,374 and 492,377 covering joint inventions with Harold E. Carnagua, of John M. Simpson and Kenneth K. Stough, respectively, which have issued as Patent No. 2,433,428, December 30, 1947, and Patent No. 2,384,439, September 11, 1945, respectively. The clutch mechanisms shown in those applications employ a single shiftable clutch member which is adapted to be locked to a shift sleeve so as to be manually shifted through said sleeve from neutral to the second speed position from which it may shift torque-responsively to direct drive, and which is adapted to be locked, under the control of such shift sleeve, to the driven shaft so as to render the torque-responsive mechanism inoperative until the clutch member is released in conjunction with engine acceleration. The present invention provides a clutch mechanism which differs from the clutch mechanism of the other inventions in that it employs two independently shiftable clutch members, one for second speed and one for direct drive, only the latter being torque-responsive, and the means for manually shifting from neutral to second speed ratio and return being connected directly at all times to the second speed clutch member. The means for locking in direct drive and the accelerator connected means for unlocking for the downshift operate only upon the direct drive clutch member, but otherwise correspond to the similar means employed in the other inventions.

A particular object of the present invention is to provide an improved control mechanism, adapted to be employed in connection with any of the clutch mechanisms discussed above, for achieving the combination of operator-controlled, torque-responsive shifting between lower and higher ratio driving positions and operator-energized shifting to and from other drive positions and neutral.

The use of independently shiftable clutch members for establishing second speed and direct drive raises the problem of correlating the two clutch members so that they cannot both become clutched to their respective coacting clutch members at the same time, and the invention has as another of its objects to provide means for preventing this occurrence.

Another problem is involved in the use of independently shiftable clutch members, namely: in order to attain a neutral condition in the transmission, both clutch members must be unclutched. To meet this problem, the invention provides means operated through the lower ratio control means, for unclutching the higher ratio clutch member when the lower ratio clutch member is moved to a neutral position (a position in which neither its two-way nor its one-way drive mechanism is in operative position) said means being adapted when the lower ratio clutch member is moved to its one-way drive position to permit the higher ratio clutch member to move to its two-way drive position in response to torque action established by the lower ratio clutch member.

Another object of the invention is to provide an improved clutch mechanism for selectively connecting one torque-transmitting member to either of a pair of torque-transmitting members which are arranged to rotate at different speeds, including a pair of independently movable clutch members each drivingly connected to the one torque-transmitting member and shiftable into clutching connection with a respective one of the pair of members, and each carrying one-way drive mechanism adapted to synchronize its respective clutch member with the cooperating member upon a reversal in the direction of relative rotation between the two members, together with torque-responsive means for shifting the higher ratio clutch element into and out of clutching connection with its cooperating member, operator-energized means for controlling the unclutching of the higher ratio clutch member, and operator energized means for moving the lower ratio clutch element between a neutral position and the lower ratio clutching position.

Other and more particular objects, advantages and uses of the present invention will become apparent from a reading of the following specification taken in connection with the accompanying drawings which form a part hereof and wherein:

Fig. 1 is a horizontal axial sectional view of a transmission embodying the invention;

Fig. 2 is a side elevation of the same, parts being broken away and illustrated in section as illustrated on the line 2—2, Fig. 1;

Fig. 3 is a transverse sectional view taken on the line 3—3 of Fig. 1, illustrating the direct drive synchronizer;

Fig. 4 is a transverse sectional view taken on the line 4—4 of Fig. 1, illustrating the second-speed synchronizer;

Fig. 5 is an axial sectional view of a portion of a clutch mechanism embodying a modification of the invention; and Fig. 6 is a side elevation, partially in section, of the lever mechanism of the clutch shown in Fig. 5.

As an example of one form in which the invention may be embodied, we have shown in Figs. 1 to 4 inclusive a transmission embodying a conventional arrangement of gearing such as that employed in a manually shifted automobile transmission. Such a transmission embodies a gear case 7, a pair of torque transmitting members rotatable at different speeds relative to each other in low speed and reverse speed ratios and conjointly at the same speed in a higher or direct drive speed ratio, said members comprising driving and driven shafts 9 and 11 journalled in the case 7, said transmission also having a counter shaft carrying a conventional gear cluster (not shown) adapted to transmit drive at a reduced ratio from the direct drive gear 13 on the drive shaft to the second speed gear 15 rotatably mounted on the driven shaft, and a low speed-reverse gear 16 on the driven shaft adapted to be shifted into and out of mesh with a conventional low speed drive gear on the counter shaft gear cluster or a conventional reverse idler. It will be apparent that all of the low and second or intermediate speed ratio gear members 15 and 16 and the high ratio gear member 13 are rotatable relative to each other and to the drive and driven shafts 9 and 11, with the exception of the gear 13 which due to its fixed relationship to shaft 9 is not rotatable relative to said shaft.

The present invention provides improved clutch mechanism or coupling means for selectively transmitting to the driven shaft 11 either a reduced ratio drive from the second speed gear 15 or a one-to-one ratio drive directly from the drive shaft 9. The clutch mechanism comprises a pair of independently shiftable coupling elements or clutch members, namely, a second speed clutch member 17 which is axially shiftably mounted on a straight-splined portion 19 of the driven shaft 11, and a direct drive clutch member 21 which is drivingly connected to the driven shaft 11 through the means of a torque responsive helically splined connection 23 which, as hereinafter pointed out is instrumental in automatically shifting the clutch member 21 to coupling position with the gear 13 in response to one driving condition in the transmission and away from coupling position with said gear in response to an opposite driving condition.

The second speed clutch member 17 is provided with two-way drive clutch teeth 24 and with ratchet pawls 25 which are pivoted on pins 26 mounted in the clutch member 17. The clutch member 17 has three positions, namely, a neutral position (shown in full lines in Fig. 1) in which it is completely disconnected from the second speed driving clutch teeth 27 of the second speed gear 15; a ratcheting or one-way drive position in which the pawls 25 register with the clutch teeth 27, and a second speed lock-up or two-way drive position in which the clutch teeth 24 mesh with the clutch teeth 27. The pawls 25 extend clockwise as viewed from the rear (see Fig. 4) and are adapted to ratchet over the clutch teeth 27 when the clutch member 17 is in the ratcheting position and when the driven shaft 11 is rotating ahead of, i. e., faster than, the second speed gear 15. Upon acceleration of the drive shaft 9 so that the second speed gear 15 tends to rotate ahead of the driven shaft, the pawls 25 will engage the clutch teeth 27 and align the two-way drive clutch teeth 24 with the spaces between the drive teeth 27 so as to permit the clutch teeth 24 to slide freely into mesh with the teeth 27.

The pawls 25 are biased toward engagement with the teeth 27 by biasing springs 28 mounted on pins 30 and 32 carried by the clutch element 17, and are provided with tails 34 which engage stop pins 36 in order to limit the inward movement of the pawls 25 to positions wherein they will clear the teeth 27 in shifting into register therewith.

The direct drive clutch member 21 is provided with ratchet pawls 29, pivoted on pins 31 mounted therein, and with two-way drive clutch teeth 33 adapted to mesh with direct drive clutch teeth 35 on the drive shaft 9.

The pawls 29 extend counter-clockwise as viewed from the rear (Fig. 3) and are adapted to make driving engagement with the direct drive clutch teeth 35 when being driven forwardly under coast torque from the driven shaft 11 while the driving teeth 35 are under a decelerating load. The pawls 29 are urged constantly into engagement with the clutch teeth 35 by biasing springs 38, mounted on pins 40 and 42 carried by the clutch element 21, and are provided with tails 34 adapted to engage stop pins 36 to limit the inward movement of the pawls.

The direct drive clutch member 21 has two positions, one of which (shown in full lines in Fig. 1) is the combined neutral and ratcheting position. In the other position, which is the direct two-way drive position, the teeth 33 are in mesh with the teeth 35. The pawls 29 serve the dual function of aligning the teeth 33 with the spaces between the teeth 35 to permit the free shifting of the teeth 33 into mesh with the teeth 35, and of transmitting a decelerating load from the drive shaft to the shiftable clutch member 21 while the driven shaft 11 is being driven forwardly under coast torque, so as to develop the torque reaction in the helically splined connection 23 which is effective to shift the clutch member 21 to the left, as viewed in Fig. 1, from its neutral-ratcheting position to the two-way direct drive position.

Recessed into the driven shaft 11 intermediate the helical splines 23 and the straight splines 19 is a snap ring 37 which limits the movement of each of the clutch members 17 and 21 away from their drive positions, at their respective neutral positions described above.

Locking mechanism or means is provided for automatically locking the direct drive clutch member 21 in its two-way drive position. Such locking mechanism comprises a plurality of locking plungers 41 axially shiftable in bores 43 in the clutch member 21 and adapted to engage in recesses 45 in helical splines 23 so as to lock the clutch member 21 against shifting movement on the driven shaft 11. A locking collar 47 is shiftable upon the cylindrical periphery of the clutch member 21 between snap rings 49 and 51 recessed into the clutch member 21. In the locking position of the collar 47 it is held against the snap ring 49 by pressure from the spring 91, and engages the interlock elements or locking plungers 41 to hold them in the recesses 45. The collar 47 is provided with an internal annular recess 53 adapted, in its unlocking position (in contact with the snap ring 51) to receive the outer ends of the locking plungers 41 so as to permit them to move out of the recesses 45.

The present invention contemplates control mechanism which is adaptable not only for controlling the clutch mechanism described in this application, but also for controlling the generally similar mechanism disclosed in the co-pending application filed simultaneously herewith, identified as Serial No. 492,374. Such control mechanism comprises operator controlled means for shifting the second speed clutch member from neutral to its ratchet or lockup position and return, and independently controlled mechanism for unlocking the direct clutch member for downshifting from direct drive to second speed. The latter control mechanism is preferably operated in conjunction with the engine throttle control as will hereinafter more fully appear.

The second speed operator-controlled means or mechanism includes a shift yoke 55 operating in an annular channel 57 in the second speed clutch member 17, and carried by a crank lever 59 which is mounted on a shaft 61 journalled in the transmission case 7. To the outer end of the shaft 61 is secured an arm 63 which is connected by suitable linkage to an operator controlled device such as a conventional shift lever.

The arm 63 has three positions indicated by the three broken lines designated "Neut" (the neutral position shown in full lines in Fig. 2), "2nd Ratchet" (corresponding to the ratcheting or one-way drive position of the clutch member 17), and "2nd Lock-up" (the two-way drive position of the clutch member 17).

The crank lever 59 is provided with three notches 65, 67 and 69 adapted to receive a combined yieldable poppet and interlock device 71 in the neutral, ratchet, and lockup positions respectively of the lever 59. The low speed-reverse gear 16 is shifted by a conventional control lever 73 having conventional reverse, neutral and low speed notches 75, 77 and 79 respectively. The interlock and poppet device 71 is of a known construction such as to permit the second speed lever 59 to be shifted only when the device 71 is engaged in the neutral notch 77 of the low speed-reverse lever 73, and to permit the low speed-reverse lever 73 to be shifted to the reverse or low speed position only when the device 71 is engaged in the neutral notch 65 of the second speed lever 59 (the notches 65 and 77 being somewhat deeper than the remaining notches 67, 69, 75, 79). When the poppet device 71 is engaged in the neutral notch 77 of the low speed-reverse lever 73, it functions to yieldingly hold the lever 59 in any of the three positions of adjustment determined by its engagement in notches 65, 67 and 69.

The kick-down operator-controlled means or mechanism for the direct drive clutch member comprises a shift yoke 81 engaged in an annular channel 83 in the locking collar 47, and mounted on a direct drive crank lever 85 which in turn is mounted on a shaft 87 journalled in the case 7 and provided at its outer end with an arm 89. A torsion spring 91, wound about the shaft 87 and having one end anchored to the shaft 61 and its other end hooked around the lever 85, yieldingly biases the lever 85 toward the left. This bias is transmitted through the collar 47 (when the latter is locked to the clutch sleeve 21 by the locking elements 41 as shown in Fig. 1) to the clutch element 21 so that the latter will, under these conditions, be energized by the spring 91 to shift from its neutral-ratcheting position to its two-way drive position. When the clutch sleeve 21 has been shifted to the latter position, the locking elements 41 will register with the notches 45 and the continuous bias of the collar 47 toward the left under the action of the spring 91 will then cause the collar to shift to its lockup position in contact with the snap ring 49, wherein it has forced the locking plungers 41 inwardly into locking engagement with the recesses 45, thus locking the sleeve 21 to the driven shaft 11 against axial shifting movement.

When the collar 47 is in the locking position just described, the lever 85 will stand in the direct drive position indicated by the broken line labeled "Direct" in Fig. 2. In order to effect the downshift from direct to second, the lever 85 is moved under operator control from the direct drive position to an intermediate position designated by the broken line labeled "Kick-down." In this position the collar 47 will have been shifted back to the right just sufficiently to register the annular groove 53 with the locking plungers 41 permitting the latter to be forced out of the recesses 45 by torque reactional movement of the clutch member 21 toward its neutral position.

Means is provided for simultaneously shifting the collar 47 to the unlocking position and establishing the torque reaction necessary to move the clutch member 21 to the right. To this end, operator-controlled means are provided in the form of the engine throttle control of accelerator pedal 92 which is adapted to move past its full throttle position designated in dotted lines and, in doing so, to operate through suitable linkage such as the push rod 93, the bell crank lever 95 and the push rod 97, to move the lever 85 to the "Kickdown" position.

The lever 59 is formed with a cam finger 99 adapted to engage a finger 101 on the lever 85 to move the latter to its neutral position when the lever 59 is moved to its neutral position, thus to establish neutral drive condition.

Means for preventing the clutch members 17 and 21 from both becoming engaged in their two-way drive positions simultaneously is provided, such means interconnecting and acting through the respective operator-controlled control levers 59 and 85 and comprising a link 103 pivoted at one end, as indicated at 105 between ears 107 on the lever 59 and having at its other end a slot 109 which receives a pin 111 mounted between a pair of ears 113 on the lever 85. When the lever 59 is shifted to the second speed lock-up position, the link 103 will engage the pin 111 and shift the lever 85 to the neutral position. Conversely, when the lever 59 is being held in the second speed lock-up position by engagement of the poppet device 71 in the notch 69, the lever 85 will be held in the neutral position against the bias of the spring 91 tending to shift it to the direct drive position.

In the operation of the transmission described above, assuming the shaft 9 to be rotating forwardly while the shaft 11 is stationary, low gear may be established in the conventional manner by shifting the gear 16 into mesh with its corresponding counter-shaft gear and then engaging the engine clutch. The shift from low to second speed is likewise accomplished in a manner generally similar to the conventional low to second shift, the lever 73 being first shifted to the neutral position to disengage the gear 16 from its countershaft gear and to unlock the lever 59 for shifting movement and the lever 59 then being shifted from the neutral position to either the ratchet or the second speed lock-up position. In shifting to either position, the drive shaft is decelerated until the second speed gear 15 is rotating more slowly than the driven shaft (but not until the drive shaft 9 decelerates to the speed of the driven shaft), the arm 63 is then shifted to the ratchet position by the operator, and the drive shaft 9 is then accelerated until the second speed drive clutch teeth 27 engage and commence to drive the pawls 25. The transmission will be normally driven in second speed ratio through the one-way drive thus established. With the pawls 25 in driven engagement with the teeth 27, the clutch teeth 24 will be synchronized with the teeth 27, and the clutch member 17 may if desired be shifted on to the lock-up position in which the driven shaft 11 may drive, under a coast load, through the clutch mechanism and against the compression of the engine. While the transmission is driving in second speed ratio the direct drive ratchet pawls will ratchet over the faster rotating direct drive clutch teeth 35.

The lever 59 is yieldingly locked or latched in the second speed ratchet position by engagement of the poppet device 71 in the notch 67 of the lever, or in the second speed lock-up position by engagement of the poppet device 71 in the notch 69.

In order to shift from second speed to direct drive, the control arm 63 must stand in the ratchet position. In this position the finger 99 which, in the neutral position, engages the finger 101 to hold the direct drive clutch member 21 in the neutral position, is moved away from the finger 101, permitting the lever 85 to shift, under the urge of the biasing spring 91, from the neutral to the direct drive position in which the groove 53 of the locking collar 47 registers with the locking elements 41. Also, in this position, the lost motion link 103, which in the second speed lockup position restrains the direct drive member from shifting to direct drive position, is shifted to a position permitting the clutch member 21 to reach the lockup position.

With the control arm 89 in the direct drive position, the fingers 99 and 101 will again be in engagement to prevent interference between the second speed clutch member 17 and the second speed gear 15. Engine deceleration causes the clutch teeth 35 to slow down while the pawls 29 continue to rotate under coast load from the driven shaft 11, and when the pawls 29 commence to rotate ahead of the clutch teeth 35 they will engage the latter, align the clutch teeth 33 with the spaces between the teeth 35, and develop the torque reaction in the helically splined connection 23 under which the clutch member 21 will shift to the left to bring the clutch teeth 33 into mesh with the clutch teeth 35. When the shifting movement of the cluch member 21 to the direct two-way drive position has been completed, the locking plungers 41 will be aligned with the recesses 45 in the driven shaft and under the continued urge of the biasing spring 91, the collar 47 will shift toward the left to the locking position, forcing the locking elements 41 into the recesses 45 and locking the clutch member 21 to the driven shaft 11 in the direct two-way drive position.

With the clutch member 21 locked in the direct drive position, the operator may now resume the transmission of forward drive through the drive shaft 9 without operating the torque responsive connection 23. During such direct forward drive, the second speed pawls will ratchet over the slower rotating second speed driving clutch teeth 27.

The down-shift from direct drive to second speed ratio is accomplished by depressing the accelerator pedal 92 to the full limit of its downward movement. This will open the throttle, establishing a forward drive accelerating torque against the torque responsive connection 23, tending to shift the clutch member 21 to the right toward its neutral position. Beyond the full open throttle position, the accelerator pedal 92 will transmit movement through the linkage 93, 95, and 97 to the control arm 89 to cause the lever 85 to move to its kickdown position against the resistance of the biasing spring 91. As the lever 85 moves to the kickdown position, it shifts the collar 47 to unlocking position in which its groove registers with the locking elements 41, and, under the torque reactional pressure toward the right exerted against it by the helically splined connection 23, the sleeve 21 will force the locking elements 41 out of the recesses 45 and into the groove 53, locking itself to the collar 47; and will then continue to move to the right until its teeth 33 are disenagged from the direct drive teeth 35. In doing so, the sleeve 21 will carry the collar 47 with it, thus moving the lever 85 to the neutral position. Under engine acceleration, the drive shaft 9 will then commence to move faster than the clutch member 21, the direct drive clutch teeth 35 ratcheting over the pawls 29. When the speed of the drive shaft has been accelerated sufficiently, the pawl 25 will engage the teeth 27 to reestablish the second speed drive. A subsequent deceleration of the driving members will again cause the clutch member 21 to shift to the direct drive position in the manner previously described.

In shifting from direct drive to second speed lock-up, the control arm 63 is moved to the second speed lock-up position, such movement being transmitted through the lever 59 to the second speed clutch member 17 to mesh the clutch teeth 24 with the second speed drive teeth 27. This movement of the lever 59 is transmitted through the linkage 103—113 to the lever 85, to shift the clutch member 21 to its neutral position. In shifting from second speed ratchet or second speed lock-up to neutral, the operator moves the arm 63 to the neutral position, this movement being transmitted through lever 59 to the clutch member 17, moving the latter to its completely disengaged position shown in Fig. 1. The movement of the lever 59 is transmitted through fingers 99 and 101 to the lever 85, moving the sleeve 21 to its neutral position in the event it is not already there.

The construction and operation of the clutch mechanism shown in Figs. 5 and 6, and the reference numerals designating the parts thereof, are the same as in the previously described form of the invention, with the following exceptions:

The locking sleeve 47a is formed separately from the channelled collar 83a in which the shift yoke 81 is engaged. The sleeve 47a is urged toward its locking position by a plurality of coil springs 48 caged in bores 50 in the sleeve 47a and compressed between the sleeve 47a and a washer 52. The collar 83a is axially shiftable on the sleeve 47a so that it may be shifted to direct drive position (by the biasing spring 91 acting through the lever 85a) as soon as the lever 59a is moved to the second speed ratchet position, in which position the finger 99 has receded so as to allow the lever 85a to thus move.

With the lever 85a in the direct drive position, the fingers 99 and 101 will remain in engagement to prevent interference between the collar 83a and the direct drive gear 13. The sleeve 47a will remain locked to the clutch member 21a and will be thereby held against shifting until the clutch member is moved to the direct drive position by torque reaction in the helically splined connection 23, whereupon the sleeve 47a will be unlocked from the clutch member 21a (by movement of the locking elements 41 into the recesses 45) and will be shifted by the springs 48 to its locking position wherein it locks the clutch member 21a to the driven shaft.

On the downshift the collar 83a is moved, through the yoke 81, against a shoulder 60 on the sleeve 47a, and will then transmit pressure to the sleeve 47a for moving the latter to the unlocking position.

The washer 52 is abutted against a snap ring 51 mounted in the direct drive clutch member 21a. The snap ring 51, and a snap ring 49, limit the shifting movement of the locking sleeve 47a on the periphery of the clutch member 21a.

The second speed clutch member 17a is provided with a peripheral flange 54 which telescopes the sleeve 47a. The flange 54 and sleeve 47a are provided, respectively, with inwardly and outwardly extending lapping flanges 58 and 56 (the former in the form of a removable snap ring) which are adapted to engage to limit separation of the two clutch members. This construction takes the place of the lost motion linkage of the previously described form of the invention, the levers 59a and 85a of the form under consideration having no direct lost motion connection for limiting separation of the clutch members.

It is understood that the foregoing description is merely illustrative of a preferred embodiment of the invention and that the scope of the invention, therefore, is not to be limited thereto but is to be determined by the appended claims.

We claim:

1. In a coupling, in combination with a pair of members, one rotatable relative to the other, a coupling member adapted for positive coupling connection with one of said members and having a driving connection with the other member permitting it to shift axially to establish said coupling connection, means for locking said coupling member in said coupling connection, yielding means constantly biasing said locking means toward its locking position, operator controlled means for releasing said locking means, and operator controlled means for shifting said coupling.

2. In a transmission, in combination with a pair of torque transmitting members arranged to rotate at different speeds, shiftable clutch means adapted for clutching connection with either of said pair of members, means for automatically shifting said clutch means into connection with one of said pair of members in response to one driving condition in said transmission and out of connection with said one member in response to an opposite driving condition, means to automatically lock said clutch means in clutching connection with said one member, operator controlled means for shifting said locking means to an unlocked position permitting said clutch means to become unclutched, and operator controlled means for shifting said clutch means, independently of said automatic shifting means to complete a clutching connection with the other of said pair of members and having clutching and unclutching positions.

3. A transmission as defined in claim 2, including means interconnecting the respective operator controlled means whereby movement of the second mentioned operator controlled means to its unclutching position will effect the movement of the first mentioned operator controlled means to the unlocked position.

4. A transmission as defined in claim 2, including means for yieldingly holding the last mentioned operator controlled means in either of its positions of adjustment.

5. In a transmission, in combination with a pair of torque transmitting members geared together for rotation at relatively low and high speeds, a third torque transmitting member, shiftable clutch means driven by said third member and adapted for clutching connection with either of said pair of members, torque responsive means for shifting said clutch means into and out of clutching connection with the higher speed member of said pair of members depending upon the direction of the transmission of torque between said pair of members and said third member, means for locking said clutch means in clutching connection with said higher speed member, operator controlled means for moving said locking means to an unlocking position permitting said clutch means to become unclutched from said higher speed member and to establish clutching connection with the lower speed member of said pair, and operator controlled means for shifting said clutch means, independently of said torque responsive means, to complete and break said lower speed clutching connection.

6. In a transmission, in combination with a pair of relatively rotatable members and a third member adapted to be selectively coupled to either of said pair of members, means for effecting said coupling, comprising coupling means drivingly connected to said third member and shiftable to establish a coupling connection with either of the respective members of said pair, means for automatically shifting said coupling means to complete one of said coupling connections in response to one driving condition in said transmission and to break said one coupling connection in response to an opposite driving condition, means to lock automatically said coupling means in said one coupling connection upon the establishment of said connection, operator controlled means for shifting said locking means to an unlocking position permitting said coupling means to become uncoupled, and operator controlled means for moving said coupling means independently of said automatic shifting means to complete other coupling connection.

7. In a transmission, in combination with a pair of relatively rotatable members and a torque transmitting member, means for selectively coupling said torque transmitting member to either of said pair of members, comprising a pair of coupling elements each drivingly connected to said torque transmitting member and shiftable into coupling connection with a respective one of said pair of members, means for automatically shifting one of said coupling elements to its coupling position in response to one driving condition in said transmission and away from its coupling position in response to an opposite driving condition, means for automatically locking said one coupling element in its coupling position upon arrival at said coupling position, operator controlled means for shifting said locking means to an unlocking position freeing said one coupling element for uncoupling movement, and operator controlled means for moving the other coupling element from a neutral position toward its coupling position.

8. In a transmission, in combination with a pair of torque transmitting members arranged to rotate at different speeds and a third torque transmitting member, means for selectively clutching said third member to either of said pair of members, comprising higher and lower ratio clutch elements each drivingly connected to said third member and shiftable into clutching connection with a respective one of said pair of members, torque responsive means for shifting the higher ratio clutch element into and out of its clutching position, means for locking said higher ratio clutch element in its clutching position, operator controlled means for moving said locking means to an unlocking position wherein it permits said higher ratio clutch element to become unclutched, and operator controlled means for shifting said lower ratio clutch element from a neutral position toward its coupling position.

9. In a transmission, in combination with a pair of torque transmitting members arranged to rotate at different speeds and a third torque transmitting member, means for selectively clutching said third member to either of said pair of members comprising a lower ratio clutch element having means for establishing a one-way driving connection and means for establishing a two-way driving connection with the lower ratio member of said pair, said lower ratio clutch element being drivingly connected to said third member and shiftable thereon from a neutral position to either of two positions wherein said one-way and two-way driving means are respectively operable, a higher ratio clutch element adapted to be clutched to the higher ratio member of said pair of members, torque responsive means drivingly connecting said higher ratio clutch element to said third member and adapted to shift said higher ratio clutch element into and out of clutching connection with said higher ratio member in response to opposite relative directions of torque transmission between said third member and said higher ratio clutch element, means for automatically locking said higher ratio clutch element in its clutching position upon arrival at that position, operator controlled means for moving said locking means to an unlocking position wherein it permits said higher ratio clutch element to become unclutched, and operator controlled means for shifting said lower ratio clutch element from the neutral position to either the one-way or the two-way driving position thereof.

10. A transmission as defined in claim 7, including yielding means biasing said locking means toward its locking position.

11. A transmission as defined in claim 5, including resilient means acting through the first mentioned operator controlled means for biasing the locking means toward its locking position.

12. A transmission as defined in claim 7, wherein said locking means comprises a sleeve encircling said one coupling element and having a recess, a recess in said torque transmitting member, an interlock element radially slidable in said one coupling element and adapted to engage in the second mentioned recess for locking said one coupling element to said torque transmitting member, or in the first mentioned recess so as to unlock said one coupling element, and spring means acting between said one coupling element and said sleeve and urging it in a direction to force said interlock element out of said first mentioned recess and into said second mentioned recess.

13. A transmission as defined in claim 7, including means interconnecting said respective operator controlled means whereby movement of the second mentioned operator controlled means to the neutral position will cause said first mentioned operator controlled means to move to the unlocking position.

14. A transmission as defined in claim 5, wherein said operator controlled means comprise a pair of oscillatable levers provided with cam fingers extending toward each other and adapted to interengage so as to cause said locking means to move to the unlocked position when the second mentioned operator controlled means is moved to break said lower speed clutching connection.

15. A transmission as defined in claim 7, including lost motion means interconnecting said other coupling element and said locking means so as to limit the separation of said coupling elements sufficiently to prevent the coupling connection of both of said elements with their respective members simultaneously.

16. A transmission as defined in claim 7, wherein said locking element comprises a sleeve encircling said one coupling element and an interlock element controlled by said sleeve and adapted to lock said one coupling element to said torque transmitting member, and wherein the other coupling element is provided with an axially extending flange telescoping said sleeve, said flange and sleeve having radially lapping portions adapted to interengage to limit the separation of said other coupling element and said locking sleeve and thereby to limit the separation of said coupling elements to prevent coupling connection of both of said coupling elements with their respective members simultaneously.

17. In a motor vehicle power system including an engine throttle and a transmission, in combination with a pair of relatively rotatable members in said transmission, a coupling member having a driving connection with one of said members and shiftable into coupling connection with the other, automatic means for urging said coupling member toward the coupling position in response to one driving condition and away from said coupling position in response to an opposite driving condition, means for locking said coupling member in the coupling position, operator controlled means for shifting said coupling member, and means operated in conjunction with opening movement of said throttle for moving said locking means to an unlocking position freeing said coupling means for uncoupling movement.

18. In a motor vehicle power system including an engine throttle and a transmission having a pair of relatively rotatable members to be coupled, a coupling member having a driving connection with one of said members and shiftable into coupling connection with the other, torque responsive means for shifting said coupling member to and from the coupling position, means for locking said coupling member in the coupling position, and means operated conjointly with the opening movement of said throttle for shifting said locking means to unlocking position freeing said coupling means for uncoupling movement.

19. In a motor vehicle power system including an engine throttle and a transmission having a pair of relatively rotatable members to be coupled, a coupling member having a driving connection with one of said members and shiftable into coupling connection with the other, torque responsive means for shifting said coupling member into and out of the coupling position, means for automatically locking said coupling member in the coupling position upon arrival at said position, means operated conjointly with the opening movement of said throttle for shifting said locking means to an unlocking position freeing said coupling member for uncoupling movement, and operator controlled means for shifting said coupling member from its coupling position to a non-coupling position.

20. In a motor vehicle power system including an engine throttle and a transmission having lower and higher ratio torque transmitting members and a third torque transmitting member, means for selectively connecting said third member to either of said other two members comprising clutch means drivingly connected to said third member and shiftable into clutching connection with either of said other two members, torque responsive means for shifting said clutch means into and out of clutching connection with said higher ratio member, means for locking said clutch means in clutching connection with said higher ratio member and having a locking and an unlocking position, resilient means constantly biasing said locking means toward the locking position, means operated conjointly with opening movement of said throttle for shifting said locking means to the unlocking position freeing said clutch means for breaking the clutching connection with said higher ratio member, and operator controlled means for shifting said clutch means into clutching connection with said lower ratio member.

21. A power system as defined in claim 19, including means interconnecting said operator controlled means and said locking means whereby movement of said operator controlled means in a direction to uncouple said coupling member will move said locking means to its unlocking position.

22. A transmission as defined in claim 7, including lost motion linkage interconnecting the respective operator controlled means so as to limit the separation of said coupling elements, whereby to prevent the simultaneous coupling connection of both of said elements with their respective members.

23. In a transmission, in combination with a pair of relatively rotatable members and a third member, means for selectively coupling said third member to either of said pair of members comprising a pair of coupling elements each adapted for positive coupling connection with a respective one of said pair of members, a torque responsive driving connection between one of said coupling members and said third member adapted to shift said one coupling member into and out of its coupling position depending upon the direction of transmission of torque between said one coupling member and said third member, and a non-torque responsive driving connection between the other coupling member and said third member permitting the shift of said other coupling member from a neutral, non-coupling position to its coupling position wherein it may function to transmit torque for operating said torque responsive connection when said one coupling member is uncoupled.

24. A transmission as defined in claim 23, including operator controlled means for shifting said other coupling member.

25. A transmission as defined in claim 23, wherein said pair of members are geared together for rotation at different speeds, and including means adapted to form one-way driving connections between said respective coupling members and their corresponding members of said pair in the uncoupled position of said one coupling member and in a position intermediate the neutral and coupled positions of said other coupling member, said one-way driving connections being adapted to function to transmit torque for operating said torque responsive connection, and being operable alternately in response to a change in the direction of relative rotation between said third member and a member of said pair.

HAROLD E. CARNAGUA.
MAURICE N. BAREHAM.

REFERENCES CITED

The following references are of record in the file of this patent:

UNITED STATES PATENTS

| Number | Name | Date |
|---|---|---|
| Re. 21,244 | Cotterman | Oct. 24, 1939 |
| 1,862,188 | Legge | June 7, 1932 |
| 2,055,671 | Ridgeway | Sept. 29, 1936 |
| 2,094,846 | Rauen | Oct. 5, 1937 |
| 2,110,964 | Ridgeway | Mar. 15, 1938 |
| 2,140,100 | Boldt et al. | Dec. 13, 1938 |
| 2,156,336 | Haigh | May 2, 1939 |
| 2,224,322 | Sinclair | Dec. 10, 1940 |
| 2,245,017 | Sinclair | June 10, 1941 |
| 2,252,042 | Sinclair | Aug. 12, 1941 |
| 2,304,863 | Thompson | Dec. 15, 1942 |
| 2,306,824 | McKechnie et al. | Dec. 29, 1942 |
| 2,320,757 | Sinclair et al. | June 1, 1943 |
| 2,322,479 | Schjolin | June 22, 1943 |
| 2,349,297 | Neracher et al. | May 23, 1944 |

FOREIGN PATENTS

| Number | Country | Date |
|---|---|---|
| 86,613 | Switzerland | May 19, 1919 |